Patented Nov. 28, 1939

2,181,310

UNITED STATES PATENT OFFICE 2,181,310

FERMENTATION PROCESS FOR PRODUCING BUTYRIC ACID

Rafael Arroyo, Rio Piedras, P. R., assignor, by mesne assignments, to Borinquen Associates, Inc., San Juan, P. R., a corporation of Puerto Rico No Drawing. Application July 27, 1936, Serial No. 92,934

13 Claims. (Cl. 195—47)

This invention relates to the production of butyric acid by fermentation of carbohydrates.

It has already been proposed to make a mixture of products, including normal butyric acid, by fermentation of glucose, but the yield was relatively low and inefficient, and the process was limited to the fermentation of hexoses, such as glucose.

It has now been found that such manufacture may be accomplished with a high theoretical efficiency, and with the yield of a large quantity of butyric acid relative to the total available carbohydrates in the fermentable substrate, by employing a bacillus found on the seed of the annatto plant (Bixa orellana).

The following is a full description of the microorganism utilized: Clostridium saccharobutyricum (new species).

I. Morphological characteristics

*Vegetative cells.*—On dextrose agar, pH 6.6, temp. 34 degrees C., age 48 hours; size 1.0–1.5 by 5.6–8.4 microns in length, ends rounded, slightly motile.

*Spores.*—Sporangia and endospores present with 24 hours, anaerobic growth, being terminal and spherical with greatly enlarged cells; irregular forms seldom seen.

*Microscopically*, cells in extremely long chains, as many as 59 having been observed in one chain.

II. Cultural characteristics

*Agar colonies.*—Dextrose agar, pH 6.6, temp. 34 degrees C., age 48 hours: form circular; surface smooth; edges entire; elevation of growth convex; optically opaque.

*Agar stroke.*—Dextrose, pH 6.6, temp. 34 degrees C., 24 hours: growth moderate; luster dull; chromogenesis none; odor of butyric acid; medium unchanged.

*Nutrient broth.*—pH 6.7, temp. 34 degrees C., age 48 hours: surface growth none; cloudiness slight; odor absent; sediment flaky and abundant.

*Gelatine stab.*—Temp. 32.5 degrees C., age 48 hours; growth best at top; liquefaction stratiform beginning in 12 hours complete in less than 48 hours. Standard methods used, medium unchanged.

*Temperature relations.*—In molasses wort, pH 6.8–7.0, optimum 30–34 degrees C.

*Chromogenesis.*—None on any media.

*Acidity.*—Optimum pH 6.8–7.0.

*Oxygen requirements.*—Pyrogallol and potassium hydroxide used, medium dextrose agar, temp. 34 degrees C.: aerobic absent anaerobic better than aerobic.

*Milk.*—34 degrees C., 96 hours: acid curd; slight peptonization.

*Litmus milk.*—34 degrees C.: litmus reduction begins in 24 hours; complete 48 hours; no curd; no peptonization; gas: slight acid.

*Indole Tryptophane broth.*—34 degrees C., 96 hours; negative.

*Yeast water extract sulfite agar.*—pH 7.0, 34 degrees C.; very positive, 48 hours.

*Nitrates, nitrate broth.*—34 degrees C.; growths scanty, no nitrite or gas in 96 hours.

*Indicator reduction.*—Medium milk, pH 6.8, 34 degrees C.; Janus green reduced 48 hours; methylene blue reduced 24 hours: litmus reduced 48 hours.

*Staining.*—Gram positive (Kopelloff Beeman's Modification). Spores positive, Ziehl Nielsen. Stains fairly easily with most stains.

*Flagella.*—Capsules absent.

III. Physiological characteristics

*Starch hydrolysis.*—Standard methods, media aerobic and anaerobic, negative 96 hours.

*Nutrient agar*, with 2 percent soluble starch, slight hydrolysis in 72 hours aerobically.

*Egg albumen.*—Not blackened or liquefied.

*Brain.*—Not blackened.

*Dextrose nutrient bile*, pH 7.2, 34 degrees C., 48 hours: fair growth; stringy sediment, medium unchanged.

IV. Fermentation reactions

With carbohydrates, bacto-nutrient broth, with indicator, at 34 degrees C.

| Rotation | Substance | Growth | Days | Acid | Gas |
|---|---|---|---|---|---|
| L | Arabinose | Good | 4 | — | — |
|   | Rhamnose | do | 4 | — | — |
| L | Xylose | None | 4 | — | — |
| D | Glucose | Good | 2 | xxx | xx |
|   | Fructose | do | 2 | xxxx | xxxx |
| D | Galactose | do | 2 | xxxx | xxxx |
| D | Mannose | do | 2 | xxxx | xxxx |
|   | Lactose | do | 4 | — | x |
|   | Sucrose | do | 2 | xxxx | xxxx |
|   | Maltose | do | 2 | xxxx | xxx |
|   | Raffinose | do | 2 | xx | x |
|   | Melezitose | do | 4 | — | — |
|   | Inulin | do | 2 | xxxx | xxx |
|   | Dextrin | do | 2 | xxx | — |
|   | Glycogen | do | 2 | xxxx | — |
|   | Glycerol | do | 2 | xxxx | xx |
|   | Erythritol | do | 4 | — | — |
|   | Mannitol | do | 2 | xxxx | xxxx |
|   | Sorbitol | do | 2 | xx | x |
|   | Dulcitol | do | 4 | — | — |
|   | Inositol | do | 4 | x | — |
|   | Salicin | do | 2 | xxx | — |

— Absent.
x Present.
xx Moderate.
xxx Abundant.
xxxx Very abundant.

The organism occurs on the seed of the annatto plant (Bixa orellana) which is indigenous to Puerto Rico. The seed is introduced into a flask of sterile wort which may be comprised of a mash as described herein. After incubation of the flask and after fermentation has begun, transfers are made to a second flask of sterile wort, and the growth allowed to continue.

One method of employing the organism is to prepare a mash comprising 1 part of black strap molasses, by weight, to 7 parts of water, and mixing thoroughly. 0.135 part by weight of calcium carbonate is then added. The mash then has a density of approximately 10.0 Brix, and is sterilized in an autoclave at 10 pounds pressure for 30 minutes. The acidity is adjusted to the preferential range of pH 6.8-7.00, and the mash is seeded with approximately 10 percent by volume of inoculating material in the form of an actively fermenting culture (18-24 hours old) of the organism, and permitted to ferment in a non-corrosive vessel (such as wood or glass) at the optimum temperature of 30 to 32 degrees C., for a time of about 96 hours.

After fermentation is substantially completed, the mash is tested with litmus and any free acid neutralized with calcium carbonate. The neutral or slightly alkaline mash is then evaporated down to one-fourth of its original volume, preferably under vacuum. The thickened or partially evaporated mash is then treated with sulphuric acid to separate the fatty acid from its calcium salt, and the mixture is then steam-distilled until all of the fatty acid has passed over into the distillate. This distillate is a dilute mixture of acid and water, and is then treated with barium hydroxid, and the butyric acid separated and recovered as the barium salt.

The product comprises 46 to 47 percent of butyric acid on the basis of the total sugars in the molasses mash, equivalent to 2.50 to 2.75 pounds of butyric acid per gallon of blackstrap molasses fermented with a theoretical efficiency of 96.0 to 97.5 and a 3 percent concentration of acids calculated on the weight of the mash.

Of the acids formed by the fermentation, butyric acid constitutes about 99 percent or more of the total acids. Other acids are thus present in traces only, and analyses indicate that the yield of precipitated barium salt is comprised of almost 100 percent of pure butyrate. The ratio of gases formed by volume of hydrogen to carbon dioxide is about 7:4, and by weight is about 4.5:56.3. The ratio of total gas to acid is about 781.2 cc. per gram of acid formed.

It has been found that the organism is capable of fermenting sucrose as readily as invert sugars, and hence there is no necessity for inverting the mash before inoculation. The time required for the completion of fermentation, and the final efficiency of conversion of the sugar, is as satisfactory where all sucrose is used as where the fermentable carbohydrates consisted exclusively of hexose sugars. Further, it will be noted that excellent fermentations can be produced of the carbohydrates glucose, fructose, galactose, mannose, sucrose, maltose, and of inulin, glycerol and mannitol. Fermentations of dextrin, glycogen, and salicin may also be accomplished, although the lack of gas fermentation indicates that the action is inefficient.

The acidity of the mash may be from 6.00 to 7.00 pH, but the yields of acids can be increased approximately 15 percent at the higher range; and it has been found that a pH of 6.8 to 7.0 is an optimum for carrying out the fermentation.

The temperatures may vary from 28 to 40 degrees C., but the optimum is from 30 to 34 degrees C., preference being given to a temperature of 30 to 32 degrees C. At successive temperatures higher than 34 degrees, it is found that the production of acid falls off sharply and that at 40 degrees, the yield is considerably lower than 28 degrees C. The efficiency is greater at the preferred temperatures of 30 to 32 degrees C., and the time required for the completion of the fermentation is materially shorter than at the lower temperatures within the bracket of 28 to 40 degrees C.

In fixing the sugar concentration, it has been found that the optimum comprises from 4.59 to 8.52 percent of sugars in the solution, with the preferred concentration around 6.5 percent, as this is a satisfactorily high density, both of the sugar and of electrolytes in the substrata, and also the toxic effects of the products of metabolism do not deleteriously affect the continued propagation of the biochemical agents during the course of fermentation.

It has been found that, in operating for extended periods, it is advantageous to employ noncorrosive material for the fermentation vat. Wood and glass have been found satisfactory. When using fermenters with exposed surfaces of metals toxic to the organism, it has been found that the products formed have a very detrimental corrosive effect upon the metal itself, and that the dissolved metal proves very detrimental to the yield of products of metabolism, and to the propagation of the organism. Fermenters of bare copper metal could not be used; and with iron vessels, the progress was attended with much impaired efficiency. It was found that an enameled iron was not fully satisfactory, as the enamel did not protect the organism from the toxic action of dissolved metal, nor did it protect the iron from the corrosive effects of the products of the fermentation.

It is preferred to keep the surface-volume ratio as low as possible, as hydrogen is liberated during the course of the fermentation; and a low ratio has a considerable influence in determining the efficiency of the conversion of sugars into the desired products. A minimum surface exposure is recommended.

When molasses is employed as a base for the fermentation mash, it is necessary to make sure that there is no nutrient deficiency. The element most frequently found to be lacking is nitrogen. Cuban molasses may contain from 1.25 to 1.5 percent of nitrogen; Puerto Rican molasses around 1.00 percent, and Egyptian molasses around 0.3 to 0.5 percent. Such nitrogen deficiency may be made up by ammonium or nitrogen oxide compounds, such as ammonium carbonate, but it is important to avoid the use of ammonium sulphate. In testing the addition of ammonium sulphate with standard mashes over a range of from 0.6 to 1.25 grams per liter, it was found that this particular nitrogenous material was detrimental, as hydrogen sulphide was formed and the yield of acid decreased. It is therefore recommended to avoid the addition of sulphur-containing materials to the mash.

More rarely, it has been found that phosphorus is deficient; and in rare instances, manganese and even copper have been found lacking in proper proportion.

The course of the fermentation of the mash is promptly evidenced by the vigorous evolution of gas, and the bleaching of the color of the mash due to the increasing acid reaction. The fermentation proceeds at an accelerated rate for the first 48 hours, after which it begins to slow down, and is usually completed in 90 to 96 hours.

In preparing the mash, it is feasible to introduce an excess of calcium carbonate for neutralizing the greatest part of the acid elaborated by the bacteria during the course of the fermentation, and it is then unnecessary to add further calcium carbonate during the course of the fermentation, as the original adjustment of the pH value with the excess of the calcium carbonate is sufficient for the course of the fermentation.

Further, the production of butyric acid by the present fermentation method is excellently adapted for commercial employment, as it avoids the usual high costs of purification of the end products of fermentation. The efficiency of production of the final acid is very high, and this final acid product consists almost entirely of butyric acid. Hence the usual stages of refractionation and purification of a heterogeneous mixture is avoided, as the acid can be distilled in a practically pure condition from the fermented mass. By employing the Othmer method, (Chemical and Metallurgical Engineering, December 1933, page 631 et seq.), it is possible to dehydrate and distill simultaneously, and the butyric acid may be recovered as such without passing through the form of metal butyrates.

The organism has been found excellently adapted for employment with blackstrap molasses of the type made in Puerto Rico and Cuba as final sugar house molasses, and containing the usual percentages of sugars therein. The organism also works with equal efficiency on beet final molasses, when this is employed in preparing the substrate; and also, as set out above, other substrata may be utilized therewith.

I claim:

1. A process of preparing butyric acid, which includes the steps of preparing a mash containing a compound selected from the group consisting of glucose, fructose, galactose, mannose, sucrose, maltose, inulin, glycerol, and mannitol; inoculating with *Clostridium saccharobutyricum* and fermenting by the action thereof; and separating a butyric acid compound from the spent mash.

2. A process of preparing butyric acid, which includes the steps of preparing a mash containing sucrose, inoculating with *Clostridium saccharobutyricum* and fermenting by the action thereof, and separating a butyric acid compound from the spent mash.

3. A process of preparing butyric acid, which includes the steps of preparing a sterile mash from molasses, inoculating with *Clostridium saccharobutyricum* and fermenting by the action thereof, and separating a butyric acid compound from the spent mash.

4. A process of preparing butyric acid, which includes the steps of preparing a mash containing a compound selected from the group consisting of glucose, fructose, galactose, mannose, sucrose, maltose, inulin, glycerol, and mannitol; inoculating with *Clostridium saccharobutyricum* and fermenting by the action thereof at a temperature of substantially 30 to 32 degrees C., and separating a butyric acid compound from the spent mash.

5. A process of preparing butyric acid, which includes the steps of preparing a mash from molasses containing sugars in concentrations of substantially 4.59 to 8.52 percent by weight, inoculating with *Clostridium saccharobutyricum* and fermenting by the action thereof, and separating a butyric acid compound from the spent mash.

6. A process of preparing butyric acid, which includes the steps of preparing a mash from molasses and containing substantially 6.5 percent by weight of sugars, inoculating with *Clostridium saccharobutyricum* and fermenting by the action thereof, and separating a butyric acid compound from the spent mash.

7. A process of preparing butyric acid, which includes the steps of preparing a sterile molasses mash having a concentration of around 6.5 percent of fermentable sugar and a pH value of 6.8 to 7.0, inoculating with *Clostridium saccharobutyricum* and fermenting by the action thereof, and separating a butyric acid compound from the spent mash.

8. A process of preparing butyric acid, which includes the steps of preparing a mash containing a compound selected from the group consisting of glucose, fructose, galactose, mannose, sucrose, maltose, inulin, glycerol, and mannitol and having a pH value of 6.8 to 7.0, inoculating with *Clostridium saccharobutyricum* and fermenting by the action thereof, and separating a butyric acid compound from the spent mash.

9. A process of preparing butyric acid, which includes the steps of preparing a molasses mash containing from 4.59 to 8.52 percent of sugars and having a pH value of 6.8 to 7.0, inoculating with *Clostridium saccharobutyricum* and fermenting by the action thereof at a temperature of substantially 30 to 32 degrees C. in a fermenter of non-corrosive material free from exposed copper and iron, and separating a butyric acid compound from the spent mash.

10. A process of preparing butyric acid, which includes the steps of preparing a mash containing a compound selected from the group consisting of glucose, fructose, galactose, mannose, sucrose, maltose, inulin, glycerol, and mannitol, inoculating with *Clostridium saccharobutyricum* and fermenting by the action thereof in the substantial absence of exposed surfaces of copper and iron, and separating a butyric acid compound from the spent mash.

11. A process of preparing butyric acid, which includes the steps of preparing a mash containing sucrose, inoculating with *Clostridium saccharobutyricum* and fermenting by the action thereof in the substantial absence of exposed surfaces of copper and iron, and separating butyric acid compound from the spent mash.

12. A process of preparing butyric acid, which includes the steps of preparing a mash containing sucrose and also containing calcium carbonate in excess of that required for neutralizing the butyric acid equivalent of the sucrose, inoculating with *Clostridium saccharobutyricum* and fermenting by the action thereof, and separating a butyric acid compound from the spent mash.

13. A process of preparing butyric acid, which includes the steps of preparing a mash from molasses and having a sugar concentration of substantially 4.59 to 8.52 percent by weight and a pH of substantially 6.8 to 7.0, inoculating with *Clostridium saccharobutyricum* and fermenting by the action thereof at a temperature of substantially 30 to 32 degrees C. in the continued presence of an excess of calcium carbonate over that required for neutralization of the butyric acid, and separating a butyric acid compound from the spent mash.

RAFAEL ARROYO.